(12) United States Patent
Yasui et al.

(10) Patent No.: US 10,598,983 B2
(45) Date of Patent: Mar. 24, 2020

(54) LIQUID CRYSTAL DISPLAY DEVICE HAVING FOUR POLARIZERS WITH DIFFERENT DEGREES OF POLARIZATION

(71) Applicant: Panasonic Liquid Crystal Display Co., Ltd., Hyogo (JP)

(72) Inventors: Yoichi Yasui, Osaka (JP); Katsuhiro Kikuchi, Hyogo (JP); Kazuhiko Tsuda, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/180,431

(22) Filed: Nov. 5, 2018

(65) Prior Publication Data

US 2019/0137817 A1    May 9, 2019

(30) Foreign Application Priority Data

Nov. 9, 2017 (JP) .................................. 2017-216588

(51) Int. Cl.
*G02F 1/1335* (2006.01)
*G02F 1/1347* (2006.01)

(52) U.S. Cl.
CPC ...... *G02F 1/133528* (2013.01); *G02F 1/1347* (2013.01); *G02F 2001/133531* (2013.01); *G02F 2001/133548* (2013.01); *G02F 2001/133562* (2013.01)

(58) Field of Classification Search
CPC combination set(s) only.
See application file for complete search history.

(56) References Cited

U.S. PATENT DOCUMENTS

2009/0147186 A1* 6/2009 Nakai ................. G02F 1/13471
349/74

FOREIGN PATENT DOCUMENTS

JP    2011-076107    4/2011

* cited by examiner

*Primary Examiner* — Lauren Nguyen
(74) *Attorney, Agent, or Firm* — Hamre, Schumann, Mueller & Larson, P.C.

(57) ABSTRACT

A liquid crystal display device includes: a first polarizing plate, a first liquid crystal cell, a second polarizing plate, a third polarizing plate, a second liquid crystal cell, and a fourth polarizing plate, which are arranged from a front side to a back side in this order. P1, P2, P3, P4 represent degrees of polarization of the first polarizing plate, the second polarizing plate, the third polarizing plate, and the fourth polarizing plate, respectively, one of a relational expression of P1>P2, P3, P4, a relational expressions of P4>P1, P2, P3, and a relational expression of P1, P4>P2, P3 is satisfied.

14 Claims, 9 Drawing Sheets

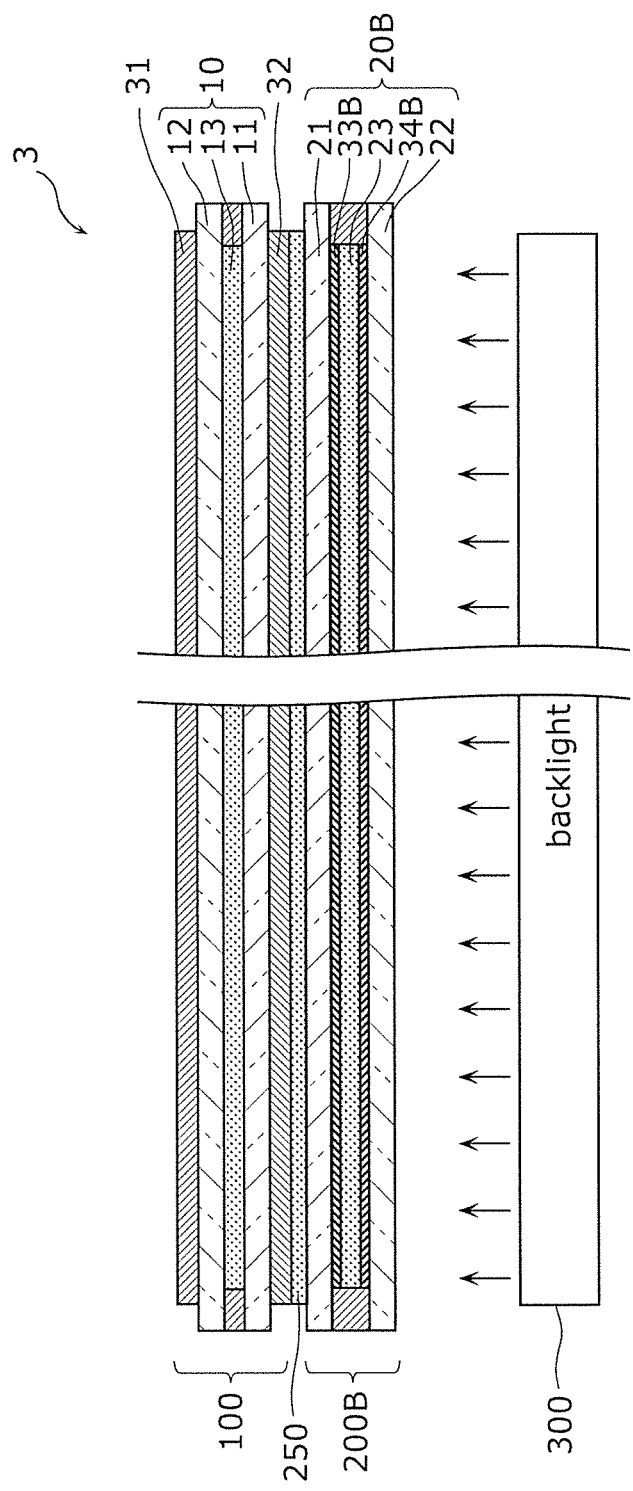

LIQUID CRYSTAL DISPLAY DEVICE HAVING FOUR POLARIZERS WITH DIFFERENT DEGREES OF POLARIZATION

CROSS-REFERENCE TO RELATED APPLICATION

This application claims priority from Japanese application JP 2017-216588, filed on Nov. 9, 2017. This Japanese application is incorporated herein by reference.

TECHNICAL FIELD

The present invention relates to a liquid crystal display device.

BACKGROUND

A liquid crystal display device using a display panel including a liquid crystal cell is used as a display of a television, a monitor or the like. However, the liquid crystal display device has a contrast ratio lower than an organic electro luminescence (EL) display device.

A technique, in which two display panels overlap each other and an image is displayed on each display panel, is conventionally proposed as a technique of improving a contrast ratio of a liquid crystal display device (for example, see Unexamined Japanese Patent Publication No. 2011-076107). A color image is displayed on a front-side (observer-side) display panel in two display panels disposed back and forth, and a black-and-white image is displayed on a rear-side (backlight-side) display panel, thereby improving the contrast ratio.

SUMMARY

Although the contrast ratio can be improved using the plurality of display panels as described above, transmittance is decreased to degrade luminance of the display image when the plurality of display panels are superimposed.

The present disclosure has been made to solve such problems, and the present disclosure provides a liquid crystal display device capable of preventing the decrease in luminance of a display image even if a plurality of display panels are used.

To solve the above problem, a liquid crystal display device according to a present disclosure includes: a first liquid crystal cell, a second liquid crystal cell disposed on a back side of the first liquid crystal cell; a first polarizing plate disposed on a front side of the first liquid crystal cell; a second polarizing plate disposed between the first liquid crystal cell and the second liquid crystal cell; a third polarizing plate disposed between the second polarizing plate and the second liquid crystal cell; and a fourth polarizing plate disposed on a back side of the second liquid crystal cell. P1, P2, P3, P4 represent degrees of polarization of the first polarizing plate, the second polarizing plate, the third polarizing plate, and the fourth polarizing plate, respectively, one of a relational expression of P1>P2, P3, P4, a relational expressions of P4>P1, P2, P3, and a relational expression of P1, P4>P2, P3 is satisfied.

BRIEF DESCRIPTION OF THE DRAWINGS

FIG. 6 is a sectional view illustrating a configuration of the liquid crystal display device of the third exemplary embodiment;

DETAILED DESCRIPTION

The following describes an exemplary embodiment of the present disclosure. The embodiment described below is merely one specific example of the present disclosure. The numerical values, shapes, materials, elements, and arrangement and connection of the elements, etc. indicated in the following embodiment are given merely by way of illustration and are not intended to limit the present disclosure. Therefore, among elements in the following embodiment, those not recited in any one of the independent claims defining the broadest inventive concept of the present disclosure are described as optional elements.

Note that the figures are schematic illustrations and are not necessarily precise depictions. Accordingly, the figures are not necessarily to scale. Moreover, in the figures, elements that are essentially the same share like reference signs. Accordingly, duplicate description is omitted or simplified.

First Exemplary Embodiment

Figure 1:
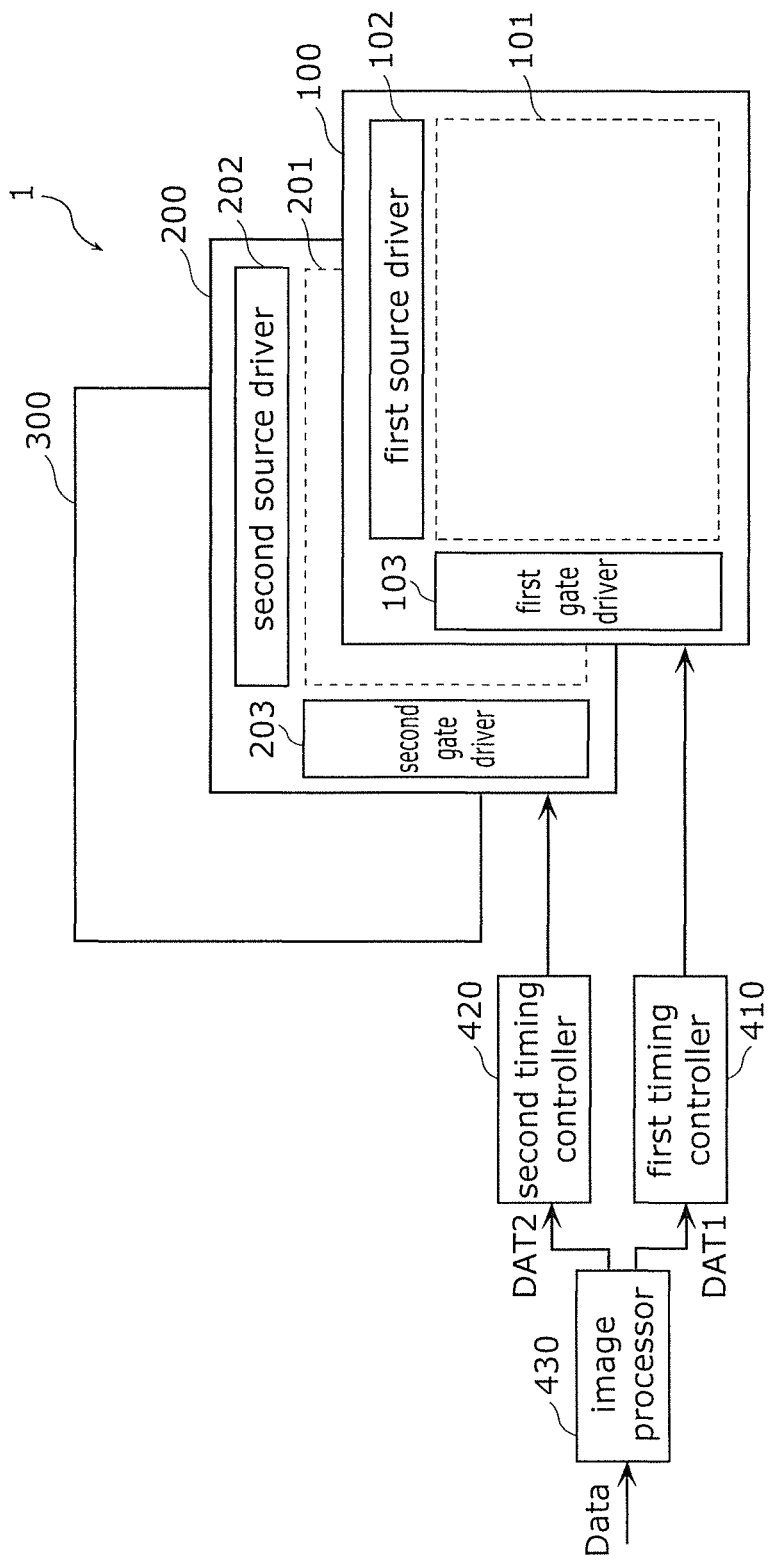
FIG. 1 is a view illustrating a schematic configuration of a liquid display device according to a first exemplary embodiment.

Liquid crystal display device 1 according to a first exemplary embodiment will be described below with reference to FIG. 1. FIG. 1 is a view illustrating a schematic configuration of liquid crystal display device 1 of the first exemplary embodiment.

Liquid crystal display device 1 is an example of an image display device configured by superimposing a plurality of display panels each of which includes liquid crystal cells, and displays an image (video) of a still image or a moving image.

As illustrated in FIG. 1, liquid crystal display device 1 of the first exemplary embodiment includes first display panel 100 disposed at a position (front side) closer to an observer, second display panel 200 disposed at a position (rear side)

farther away from the observer than first display panel 100, and backlight 300 disposed on a rear side of second display panel 200.

First display panel 100 is a main panel that displays an image visually recognized by a user. In the first exemplary embodiment, first display panel 100 displays a color image. First source driver 102 and first gate driver 103 are provided in first display panel 100 in order to display the color image corresponding to an input video signal on first image display region 101 (active region).

Second display panel 200 is a sub-panel disposed on a back side of first display panel 100. In the first exemplary embodiment, second display panel 200 displays a monochrome image (black-and-white image) of an image corresponding to the color image displayed on first display panel 100 in synchronization with the color image. Second source driver 202 and second gate driver 203 are provided on second display panel 200 in order to display a monochrome image corresponding to an input video signal on second image display region 201.

First image display region 101 and second image display region 201 include a plurality of pixels arranged in a matrix. A number of pixels in first image display region 101 may be equal to or different from a number of pixels in second image display region 201, but the number of pixels in first image display region 101 of first display panel 100 that is a main panel is preferably larger than the number of pixels in second image display region 201 of second display panel 200 that is a sub-panel.

For example, driving systems of first display panel 100 and second display panel 200 are a lateral electric field system such as an in-plane switching (IPS) system or a fringe field switching (FFS) system. However, the driving system is not limited to the lateral electric field system, but may be a vertical alignment (VA) system or a twisted nematic (TN) system.

Backlight 300 emits light toward first display panel 100 and second display panel 200. The light emitted from backlight 300 is transmitted through second display panel 200, and then transmitted through first display panel 100.

In the first exemplary embodiment, backlight 300 is a surface light source unit that emits planar and uniform diffused light (scattered light). For example, backlight 300 is a light emitting diode (LED) backlight in which an LED is used as a light source. However, backlight 300 is not limited to the LED backlight. In the first exemplary embodiment, backlight 300 is a direct type backlight, and a plurality of LEDs are two-dimensionally arranged.

Backlight 300 is not limited to the direct type, but may be an edge type. Backlight 300 may include an optical member such as a diffusion plate (diffusion sheet) for diffusing the light from the light source and a prism sheet for controlling light distribution.

Liquid crystal display device 1 also includes first timing controller 410 that controls first source driver 102 and first gate driver 103 of first display panel 100, second timing controller 420 that controls second source driver 202 and second gate driver 203 of second display panel 200, and image processor 430 that outputs image data to first timing controller 410 and second timing controller 420.

Image processor 430 receives input video signal Data transmitted from an external system (not illustrated), performs image processing on input video signal Data, outputs first image data DAT1 to first timing controller 410, and outputs second image data DAT2 to second timing controller 420. Image processor 430 also outputs a control signal (not illustrated in FIG. 1) such as a synchronizing signal to first timing controller 410 and second timing controller 420. First image data DAT1 is image data used to display a color image, and second image data DAT2 is image data used to display a monochrome image.

In liquid crystal display device 1 of the first exemplary embodiment, an image is displayed while two display panels of first display panel 100 and second display panel 200 are superimposed on each other, so that black can be tightened. Consequently, an image having a high contrast ratio can be displayed.

For example, liquid crystal display device 1 is a high dynamic range (HDR) compatible television. In liquid crystal display device 1, a color image having high contrast ratio and high image quality can be displayed using a backlight capable of performing local dimming control as backlight 300.

First display panel 100 and second display panel 200 are held together with backlight 300 by a holding member (a frame or a chassis) made of metal or resin while bonded together. First display panel 100 and second display panel 200 may be held by the holding member in a separated manner without being bonded together.

Figure 2:
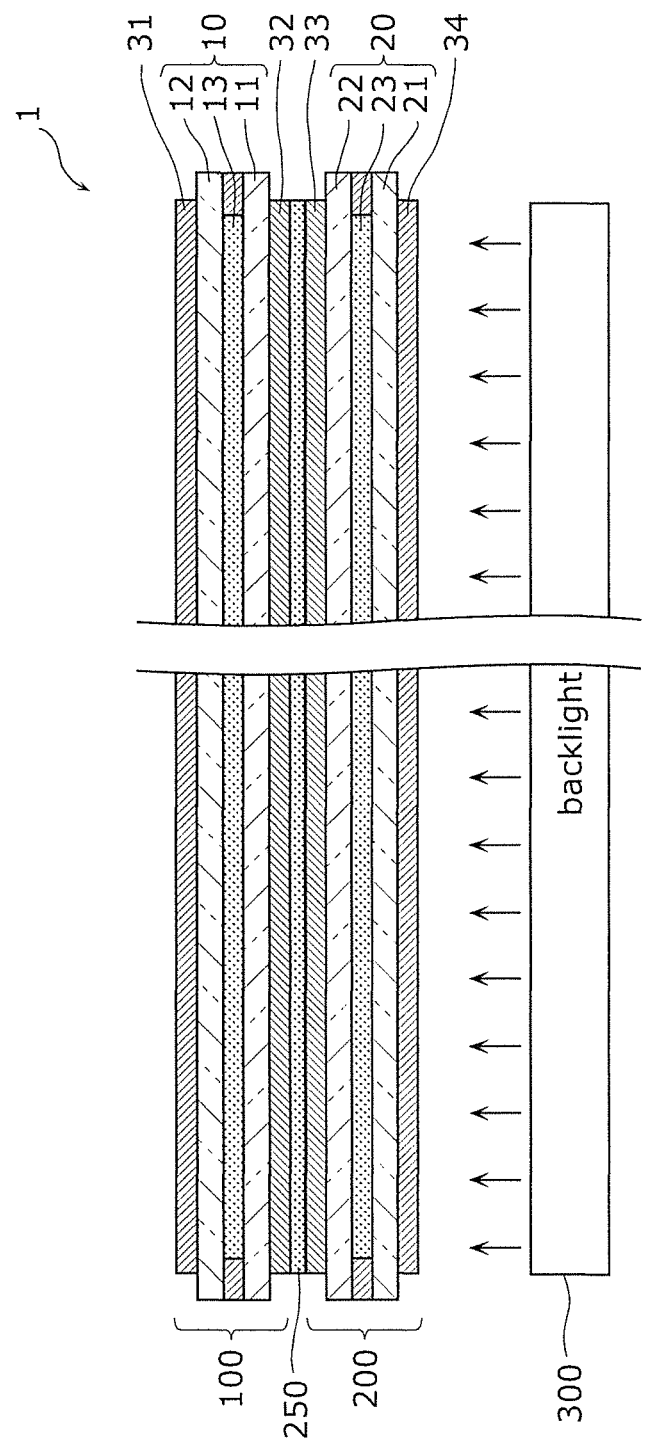
FIG. 2 is a sectional view illustrating a configuration of the liquid crystal display device of the first exemplary embodiment.

Specific structures of first display panel 100 and second display panel 200 will be described below with reference to FIG. 2. FIG. 2 is a sectional view illustrating a configuration of liquid crystal display device 1 of the first exemplary embodiment.

As illustrated in FIG. 2, liquid crystal display device 1 includes first display panel 100 and second display panel 200 as a liquid crystal module. In the first exemplary embodiment, first display panel 100 and second display panel 200 are bonded together by bonding member 250 such as an adhesive sheet.

First display panel 100 and second display panel 200 are a liquid crystal display panel including a liquid crystal cell. Specifically, first display panel 100 includes first liquid crystal cell 10 and a pair of first polarizing plate 31 and second polarizing plate 32. Second display panel 200 includes second liquid crystal cell 20 and a pair of third polarizing plate 33 and fourth polarizing plate 34.

Second display panel 200 is disposed on the back side of first display panel 100, so that second liquid crystal cell 20 of second display panel 200 is disposed on the back side of first liquid crystal cell 10 of first display panel 100.

First liquid crystal cell 10 includes first thin film transistor (TFT) substrate 11, first counter substrate 12 opposed to first TFT substrate 11, and first liquid crystal layer 13 disposed between first TFT substrate 11 and first counter substrate 12. In the first exemplary embodiment, first liquid crystal cell 10 is disposed such that first counter substrate 12 is located in front of first TFT substrate 11.

First TFT substrate 11 is a substrate in which a TFT layer (not illustrated) is formed on a transparent substrate such as a glass substrate. A TFT provided according to each of the pixels arranged in a matrix and a wiring used to supply voltage to the TFT are formed in the TFT layer. A pixel electrode used to apply the voltage to first liquid crystal layer 13 is formed on a planarization layer of the TFT layer. In the first exemplary embodiment, first liquid crystal cell 10 is driven by the lateral electric field system, so that a common electrode opposed to the pixel electrode is also formed on first TFT substrate 11.

First counter substrate 12 is a color filter (CF) substrate in which a color filter layer is formed as a pixel formation layer on a transparent substrate such as a glass substrate. The pixel formation layer of first counter substrate 12 includes a black matrix in which a plurality of openings are formed in a matrix and a plurality of color filters formed in the openings of the black matrix. The plurality of color filters are a color filter for red, a color filter for green, or a color filter for blue, which are formed according to the pixels.

First liquid crystal layer 13 is sealed between first TFT substrate 11 and first counter substrate 12. For example, first liquid crystal layer 13 is sealed by forming a sealing member into the frame shape along outer peripheral ends of first TFT substrate 11 and first counter substrate 12. The liquid crystal material of first liquid crystal layer 13 can appropriately be selected according to the driving system.

Second liquid crystal cell 20 includes second TFT substrate 21, second counter substrate 22 opposed to second TFT substrate 21, and second liquid crystal layer 23 disposed between second TFT substrate 21 and second counter substrate 22. In the first exemplary embodiment, second liquid crystal cell 20 is disposed such that second counter substrate 22 is located in front of second TFT substrate 21. In the first exemplary embodiment, second liquid crystal cell 20 may be disposed such that second TFT substrate 21 is located in front of second counter substrate 22.

Second TFT substrate 21 has the same configuration as first TFT substrate 11, and is a substrate in which a TFT layer (not illustrated) is formed on a transparent substrate such as a glass substrate. The pixel electrode and the common electrode opposed to the pixel electrode are also formed on second TFT substrate 21 in order to apply the voltage to second liquid crystal layer 23.

Second counter substrate 22 is a substrate in which a pixel formation layer is formed on a transparent substrate such as a glass substrate. The pixel formation layer of second counter substrate 22 includes the black matrix in which the plurality of openings in a matrix are formed. In the first exemplary embodiment, second display panel 200 displays a monochrome image, so that the color filter is not formed in the pixel formation layer of second counter substrate 22.

Second liquid crystal layer 23 is sealed between second TFT substrate 21 and second counter substrate 22. For example, second liquid crystal layer 23 is sealed by forming the sealing member into the frame shape along outer peripheral ends of second TFT substrate 21 and second counter substrate 22. A liquid crystal material of second liquid crystal layer 23 can appropriately be selected according to the driving system.

As described above, four polarizing plates of first polarizing plate 31, second polarizing plate 32, third polarizing plate 33, and fourth polarizing plate 34 are used in liquid crystal display device 1. First polarizing plate 31, second polarizing plate 32, third polarizing plate 33, and fourth polarizing plate 34 are disposed in this order from the observer side toward backlight 300.

In the first exemplary embodiment, first polarizing plate 31 and second polarizing plate 32 are disposed such that first liquid crystal cell 10 is sandwiched therebetween. Third polarizing plate 33 and fourth polarizing plate 34 are disposed such that second liquid crystal cell 20 is sandwiched therebetween.

Specifically, first polarizing plate 31 is disposed on the front side (viewer side) of first liquid crystal cell 10, and second polarizing plate 32 is disposed on the back side (the side of backlight 300) of first liquid crystal cell 10. Third polarizing plate 33 is disposed on the front side of second liquid crystal cell 20, and fourth polarizing plate 34 is disposed on the back side of second liquid crystal cell 20.

Both second polarizing plate 32 and third polarizing plate 33 are disposed between first liquid crystal cell 10 and second liquid crystal cell 20, and second polarizing plate 32 is located closer to the viewer side than third polarizing plate 33. That is, second polarizing plate 32 is disposed between first liquid crystal cell 10 and third polarizing plate 33, and third polarizing plate 33 is disposed between second polarizing plate 32 and second liquid crystal cell 20.

Fourth polarizing plate 34 is disposed on the back side of second liquid crystal cell 20. That is, fourth polarizing plate 34 is disposed between second liquid crystal cell 20 and backlight 300.

In the first exemplary embodiment, first polarizing plate 31 and second polarizing plate 32 are bonded to first liquid crystal cell 10. Specifically, first polarizing plate 31 is bonded to an outer surface of first counter substrate 12 of first liquid crystal cell 10, and second polarizing plate 32 is bonded to an outer surface of first TFT substrate 11 of first liquid crystal cell 10.

Third polarizing plate 33 and fourth polarizing plate 34 are bonded to second liquid crystal cell 20. Specifically, third polarizing plate 33 is bonded to an outer surface of second counter substrate 22 of second liquid crystal cell 20, and fourth polarizing plate 34 is bonded to an outer surface of second TFT substrate 21 of second liquid crystal cell 20.

First polarizing plate 31 and second polarizing plate 32 are disposed such that polarization axes of first polarizing plate 31 and second polarizing plate 32 are orthogonal to each other. First polarizing plate 31 and second polarizing plate 32 are disposed such that a crossed Nicol positional relationship holds. Similarly, third polarizing plate 33 and fourth polarizing plate 34 are disposed such that polarization axes of third polarizing plate 33 and fourth polarizing plate 34 are orthogonal to each other. Third polarizing plate 33 and fourth polarizing plate 34 are disposed such that the crossed Nicol positional relationship holds.

In the first exemplary embodiment, second polarizing plate 32 and third polarizing plate 33 are disposed such that polarization axes of second polarizing plate 32 and third polarizing plate 33 are substantially parallel to each other. Thus, first polarizing plate 31 and fourth polarizing plate 34 are disposed such that polarization axes of first polarizing plate 31 and fourth polarizing plate 34 are substantially parallel to each other. Specifically, absorption axes of second polarizing plate 32 and third polarizing plate 33 are substantially parallel to each other, and absorption axes of first polarizing plate 31 and fourth polarizing plate 34 are substantially parallel to each other.

Each of the four polarizing plates of first polarizing plate 31, second polarizing plate 32, third polarizing plate 33, and fourth polarizing plate 34 is a sheet-shaped polarizing film made of, for example, a resin material, and includes a base material and polarizers laminated on the base material. For example, the base material is a support film made of a transparent resin film such as a triacetylcellulose (TAC) film. The polarizer is a resin layer in which a dichroic substance such as iodine is adsorbed and aligned.

In the first exemplary embodiment, first polarizing plate 31, second polarizing plate 32, third polarizing plate 33, and fourth polarizing plate 34 are configured to satisfy a predetermined relationship with respect to a degree of polarization. Specifically, assuming that P1, P2, P3, P4 are the degrees of polarization of first polarizing plate 31, second polarizing plate 32, third polarizing plate 33, and fourth polarizing plate 34, respectively, one of a relational expression of $P1>P2, P3, P4$, a relational expression of $P4>P1, P2, P3$, and a relational expressions of $P1, P4>P2, P3$ is satisfied.

That is, in the four polarizing plates of first polarizing plate 31, second polarizing plate 32, third polarizing plate 33, and fourth polarizing plate 34, the degree of polarization of at least one of first polarizing plate 31 and fourth polarizing plate 34 is larger than the degrees of polarization of the other three polarizing plates. In other words, the degrees of polarization of second polarizing plate 32 and third polarizing plate 33 are smaller than the degree of polarization of at least one of first polarizing plate 31 and fourth polarizing plate 34.

As an example, in the case that degree of polarization P1 of first polarizing plate 31 is the largest among the four polarizing plates, it is preferable that P1≥99.99% and 99.65%≤P2, P3, P4<99.99% hold. In this case, P2, P3, P4 may be equal to or different from one another when P2, P3, P4 are smaller than P1.

The degree of polarization is an index indicating polarization performance (performance to linearly polarize light), and is calculated by the following equation (1).

$$P(\text{degree of polarization}) = \sqrt{\{(Tp-Tc)/(Tp+Tc)\}} \times 100 \\ (\%) = (Tt-Ta)/(Tt+Ta) \times 100\% \quad (1)$$

Where Tp is what is called parallel transmittance, and expresses transmittance with respect to natural light while a pair of target polarizing plates is prepared and disposed in a parallel Nicol state. For example, parallel transmittance Tp of first polarizing plate 31 is a value that is obtained by measuring the transmittance with respect to the natural light while the pair of polarizing plates made of the same material as first polarizing plate 31 is disposed in the parallel Nicol state. Tc is what is called cross transmittance, and expresses transmittance with respect to the natural light while the pair of target polarizing plates is prepared and disposed in an orthogonal (crossed) Nicol state.

Tt is a single transmittance in a direction of a transmission axis, and refers to transmittance when linearly polarized light parallel to the transmission axis is incident on the target polarizing plate. Ta is a single transmittance in a direction of an absorption axis, and refers to transmittance when the linearly polarized light parallel to the absorption axis is incident on the target polarizing plate.

On the other hand, when degree of polarization P4 of fourth polarizing plate 34 is the largest among the four polarizing plates, it is preferable that P4≥99.99% and 99.65%≤P1, P2, P3<99.99% hold. In this case, P1, P2, P3 may be equal to or different from one another when P1, P2, P3 are smaller than P4.

Alternatively, in the case that the degrees of polarization of first polarizing plate 31 and fourth polarizing plate 34 among the four polarizing plates are larger than the degrees of polarization of second polarizing plate 32 and third polarizing plate 33, it is preferable that P1, P4≥99.99% and 99.58%≤P2, P3<99.99% hold. In this case, P1, P4 may be equal to or different from each other, and P2, P3 may be equal to or different from each other.

The four polarizing plates used in the first exemplary embodiment are a polarizing film having a characteristic that the single transmittance increases with degreasing degree of polarization. Thus, assuming that Tm1, Tm2, Tm3, Tm4 are the single transmittances of first polarizing plate 31, second polarizing plate 32, third polarizing plate 33, and fourth polarizing plate 34, respectively, the single transmittances of the four polarizing plates satisfy a relational expression of Tm1<Tm2, Tm3, Tm4 when the degrees of polarization of the four polarizing plates satisfy the relational expression of P1>P2, P3, P4. Single transmittance Tm of the polarizing plate refers to the transmittance when the natural light is incident on the target polarizing plate, and is expressed by the following equation (2).

$$Tm = (Tt+Ta)/2 \quad (2)$$

Similarly, the relational expression of Tm4<Tm1, Tm2, Tm3 is satisfied when the relational expression of P4>P1, P2, P3 is satisfied, and the relational expression of Tm1, Tm4<Tm2, Tm3 is satisfied when the relational expression of P1, P4>P2, P3 is satisfied.

In the first exemplary embodiment, each of the four polarizing plates of first polarizing plate 31, second polarizing plate 32, third polarizing plate 33, and fourth polarizing plate 34 is an absorption type polarizing plate in which one of two orthogonal components of the transmitted light is absorbed by the absorption axis while the other is transmitted by the transmission axis. Thus, the single transmittance of each of the four polarizing plates is less than 50%.

Assuming that d1, d2, d3, d4 are thicknesses of the polarizers of the first polarizing plate 31, second polarizing plate 32, third polarizing plate 33, and fourth polarizing plate 34, respectively, the relational expression of d1, d4>d2, d3 is satisfied.

In the first exemplary embodiment, first liquid crystal cell 10 to which first polarizing plate 31 is bonded is located closer to the observer's side than second liquid crystal cell 20 to which fourth polarizing plate 34 is bonded. For this reason, in consideration of quality of an image viewed by the observer, it is preferable that degree of polarization P1 of first polarizing plate 31 is larger than degree of polarization P4 of fourth polarizing plate 34 (P1>P4). Thus, P1=99.99%, P2=P3=P4=99.96% in liquid crystal display device 1 of the first exemplary embodiment.

Next, actions of liquid crystal display device 1 of the first exemplary embodiment will be described below including circumstances leading to the present disclosure.

As described above, two display panels are superimposed on each other in the front-rear direction, a color image is displayed on the front-side display panel, and a black-and-white image is displayed on the rear-side display panel, which allows the improvement of the contrast ratio. For example, in the case that the contrast ratio of one display panel is greater than or equal to 1000:1, the high contrast ratio of 1 million:1 or more can be achieved by superimposing the two display panels.

However, in the liquid crystal display device, the image is displayed by transmitting the light of the backlight through the display panel. For this reason, when the two display panels are superimposed, the light of the backlight is transmitted through the two display panels, so that the transmittance of the liquid crystal display device is decreased. As a result, the luminance of the display image is decreased as compared with the liquid crystal display device constructed with one display panel.

The inventors of the present disclosure have focused on the light transmitted through the pair of polarizing plates (that is, four polarizing plates) with which the liquid crystal cell of each of the two display panels is sandwiched, and studied a liquid crystal display device that can prevent the decrease in transmittance while maintaining the high contrast ratio. Details of the study content will be described below with reference to FIG. 3.

Figure 3:
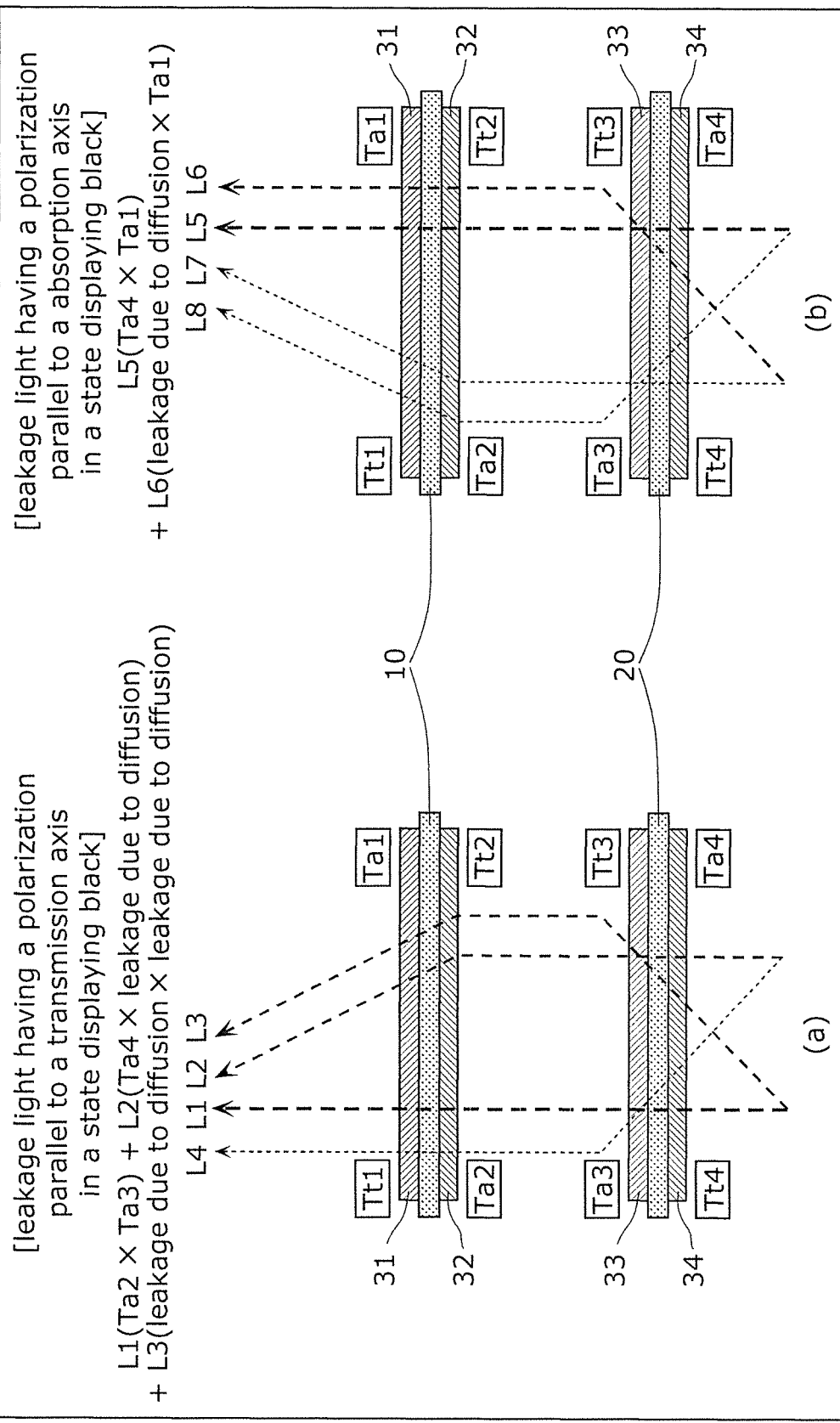
FIG. 3 is a view illustrating components of the light leaking onto the observer's side when a black image is displayed on two liquid crystal cells in a liquid crystal display device in which two liquid crystal cells and four polarizing plates are used.

FIG. 3 is a view illustrating components of the light leaking onto the observer's side when a black image is displayed on two liquid crystal cells in a liquid crystal display device in which two liquid crystal cells (first liquid crystal cell 10 and second liquid crystal cell 20) and four polarizing plates (first polarizing plate 31 to fourth polarizing plate 34) are used similarly to the liquid crystal display device in FIG. 2. A part (a) of FIG. 3 illustrates the light leaking out from the transmission axis side of first polarizing plate 31 disposed closest to the observer's side, and a part (b)

of FIG. 3 illustrates the light leaking out from the absorption axis side of first polarizing plate 31. In FIG. 3, the backlight is omitted.

In FIG. 3, the four polarizing plates of first polarizing plate 31, second polarizing plate 32, third polarizing plate 33, and fourth polarizing plate 34 are an absorption type polarizing plate, and each of the polarizing plates includes the absorption axis and the transmission axis orthogonal to the absorption axis. Ta1, Ta2, Ta3, Ta4 express the single transmittances (hereinafter, simply referred to as the transmittance in the absorption axis direction) in the absorption axis directions of first polarizing plate 31, second polarizing plate 32, third polarizing plate 33, and fourth polarizing plate 34, respectively. That is, as Ta1, Ta2, Ta3, Ta4 are decreased, the amount of light leaking out from each polarizing plate is decreased, and the contrast ratio of the liquid crystal display device is increased. In FIG. 3, Tt1, Tt2, Tt3, Tt4 express the single transmittances (hereinafter, simply referred to as the transmittance in the transmission axis direction) in the transmission axis directions of first polarizing plate 31, second polarizing plate 32, third polarizing plate 33, and fourth polarizing plate 34. At this point, it is assumed that each of the single transmittances Tt1 to Tt4 in the transmission axis directions of the polarizing plates is 100%.

The transmittance of white displaying state is decided only by the light transmitted through the transmission axis of the polarizing plate. In the natural light, a light amount of a polarized light component parallel to the transmission axis of the polarizing plate can be regarded to be equal to a light amount of a polarized light component perpendicular to the transmission axis of the polarizing plate. Consequently, the light amount during white display becomes 1 when, in the natural light incident on the display panel, each of the light amount of the polarized light component parallel to the transmission axis of the polarizing plate and the light amount of the polarized light component parallel to the absorption axis of the polarizing plate is set to 1. The contrast of 1 (light amount during white displaying state)/(light leaking out from display panel during black displaying state) can be obtained by specifying the light leaking out from the display panel during the black display under this condition.

Part of the light is scattered when transmitted through the display panel, so that part of the light leaking out from the display panel during the black displaying state depends on scattering leakage. In FIG. 3, the scattering leakage is indicated by a tilt line. The scattering leakage is generated irrespective of an absorption rate and transmittance of the absorption axis of the polarizing plate. In FIG. 3, all the degrees of polarization of the four polarizing plates are equal to one another.

In consideration of the light leaking out from first polarizing plate 31, the light leaking out from the transmission axis side of first polarizing plate 31 exists as illustrated in the part (a) of FIG. 3. Four kinds of leakage light of first leakage light L1, second leakage light L2, third leakage light L3, and fourth leakage light L4 are considered as the light leaking out from the transmission axis side of first polarizing plate 31.

In first leakage light L1, the light of the polarized light component parallel to the transmission axis of fourth polarizing plate 34 is transmitted through the transmission axis of fourth polarizing plate 34, transmitted through the absorption axis of third polarizing plate 33, transmitted through the absorption axis of second polarizing plate 32, and leaks through the transmission axis of first polarizing plate 31. Because transmittance Tt1 in the transmission axis direction is assumed to be 100% and the light amount of the polarized light component parallel to the transmission axis of fourth polarizing plate 34 is assumed to be 1 as described above, magnitude of first leakage light L1 depends on the transmittance (Ta3) in the absorption axis direction of third polarizing plate 33 and the transmittance (Ta2) in the absorption axis direction of second polarizing plate 32, more specifically the magnitude of first leakage light L1 becomes a product of the transmittance (Ta3) and the transmittance (Ta2).

In second leakage light L2, the light of the polarized light component parallel to the absorption axis of fourth polarizing plate 34 is transmitted through the absorption axis of fourth polarizing plate 34, transmitted through the transmission axis of third polarizing plate 33, transmitted through the transmission axis of second polarizing plate 32, scatters and leaks at first display panel 100, and leaks through the transmission axis of first polarizing plate 31. Because transmittance Tt in the transmission axis direction is assumed to be 100% and the light amount of the polarized light component parallel to the absorption axis of fourth polarizing plate 34 is assumed to be 1 as described above, the magnitude of second leakage light L2 depends on the transmittance (Ta4) in the absorption axis direction of fourth polarizing plate 34 and the scattering leakage at first display panel 100.

In third leakage light L3, the light of the polarized light component parallel to the transmission axis of fourth polarizing plate 34 is transmitted through the transmission axis of fourth polarizing plate 34, scatters and leaks at second display panel 200 to be transmitted through third polarizing plate 33, is transmitted through the transmission axis of the second polarizing plate 32 to scatter and leak at first display panel 100, and leaks through the transmission axis of the first polarizing plate 31. Thus, the magnitude of third leakage light L3 depends on the scattering leakage at second display panel 200 and the scattering leakage at first display panel 100. Third leakage light L3 leaks out without being transmitted through any of the absorption axes of the four polarizing plates.

In fourth leakage light L4, the light of the polarized light component parallel to the absorption axis of fourth polarizing plate 34 is transmitted through the absorption axis of fourth polarizing plate 34 to scatter and leak at second display panel 200, transmitted through the absorption axis of third polarizing plate 33, transmitted through the absorption axis of second polarizing plate 32, and leaks through the transmission axis of first polarizing plate 31. Thus, the magnitude of fourth leakage light L4 depends on the transmittance (Ta4) in the absorption axis direction of fourth polarizing plate 34, the scattering leakage at second display panel 200, the transmittance (Ta3) in the absorption axis direction of third polarizing plate 33, and the transmittance (Ta2) in the absorption axis direction of second polarizing plate 32.

Fourth leakage light L4 is transmitted through the absorption axes of the three polarizing plates which are fourth polarizing plate 34, third polarizing plate 33, and second polarizing plate 32, so that fourth leakage light L4 has larger light attenuation due to the absorption as compared with first leakage light L1, second leakage light L2, and third leakage light L3. Thus, fourth leakage light L4 has a very small light leakage amount as compared with first leakage light L1, second leakage light L2, and third leakage light L3, and fourth leakage light L4 has an extremely small influence on the contrast ratio. Thus, fourth leakage light L4 can be ignored in studying the contrast ratio.

As described above, in the light leaking out from the transmission axis side of first polarizing plate 31, the leakage light having the influence on the contrast ratio is first leakage light L1 (Ta3×Ta4), second leakage light L2 (Ta4×scattering leakage), and third leakage light L3 (scattering leakage× scattering leakage).

As illustrated in the part (b) of FIG. 3, the leakage light going out from the absorption axis side of first polarizing plate 31 exists as the leakage light going out from first polarizing plate 31. Four kinds of leakage light of fifth leakage light L5, sixth leakage light L6, seventh leakage light L7 and eighth leakage light L8 are considered as the leakage light going out from the absorption axis side of first polarizing plate 31.

In fifth leakage light L5, the light of the polarized light component parallel to the absorption axis of fourth polarizing plate 34 is transmitted through the absorption axis of fourth polarizing plate 34, transmitted through the transmission axis of third polarizing plate 33, transmitted through the transmission axis of second polarizing plate 32, and leaks through the absorption axis of first polarizing plate 31. Thus, the magnitude of fifth leakage light L5 depends on the transmittance (Ta4) in the absorption axis direction of fourth polarizing plate 34 and the transmittance (Ta4) in the absorption axis direction of first polarizing plate 31.

In sixth leakage light L6, the light of the polarized light component parallel to the transmission axis of fourth polarizing plate 34 is transmitted through the transmission axis of fourth polarizing plate 34 to scatter and leak at second display panel 200, transmitted through the transmission axis of third polarizing plate 33, transmitted through the transmission axis of second polarizing plate 32, and leaks through the absorption axis of first polarizing plate 31. Thus, the magnitude of sixth leakage light L6 depends on the scattering leakage at second display panel 200 and the transmittance (Ta1) in the absorption axis direction of first polarizing plate 31.

In seventh leakage light L7, the light of the polarized light component parallel to the transmission axis of fourth polarizing plate 34 is transmitted through the transmission axis of fourth polarizing plate 34, transmitted through the absorption axis of third polarizing plate 33, transmitted through the absorption axis of second polarizing plate 32 to scatter and leak at first display panel 100, and leaks through the absorption axis of first polarizing plate 31. Therefore, the magnitude of the seventh leakage light L7 depends on the transmittance (Ta3) in the absorption axis direction of third polarizing plate 33, the transmittance (Ta2) in the absorption axis direction of second polarizing plate 32, the scattering leakage of first display panel 100, and the transmittance (Ta1) in the absorption axis direction of first polarizing plate 31.

In eighth leakage light L8, the light of the polarized light component parallel to the transmission axis of fourth polarizing plate 34 is transmitted through the absorption axis of fourth polarizing plate 34 to scatter and leak at second display panel 200, transmitted through the absorption axis of third polarizing plate 33, transmitted through the absorption axis of second polarizing plate 32 to scatter and leak at first display panel 100, and leaks through the absorption axis of first polarizing plate 31. Thus, the magnitude of the eighth leakage light L8 depends on the transmittance (Ta4) in the absorption axis direction of fourth polarizing plate 34, the scattering leakage at second display panel 200, the transmittance (Ta3) in the absorption axis direction of third polarizing plate 33, the transmittance (Ta2) in the absorption axis direction of second polarizing plate 32, and the transmittance (Ta1) in the absorption axis direction of first polarizing plate 31.

Seventh leakage light L7 is transmitted through the absorption axes of the three polarizing plates of third polarizing plate 33, second polarizing plate 32, and first polarizing plate 31. Eighth leakage light L8 is transmitted through the absorption axes of the four polarizing plates of fourth polarizing plate 34, third polarizing plate 33, second polarizing plate 32, and first polarizing plate 31. For this reason, seventh leakage light L7 and eighth leakage light L8 have larger light attenuation due to the absorption as compared with fifth leakage light L5 and sixth leakage light L6. Thus, seventh leakage light L7 and eighth leakage light L8 have a very small light leakage amount as compared with fifth leakage light L5 and sixth leakage light L6, and seventh leakage light L7 and eighth leakage light L8 have an extremely small influence on the contrast ratio. Thus, seventh leakage light L7 and eighth leakage light L8 can be ignored in studying the contrast ratio.

As described above, in the light leaking out from the absorption axis side of first polarizing plate 31, the leakage light having the influence on the contrast ratio is fifth leakage light L5 (Ta4×Ta3) and sixth leakage light L6 (scattering leakage×Ta1).

Thus, the leakage light having the influence on the contrast ratio in the light leaking out from first polarizing plate 31 is first leakage light L1, second leakage light L2, third leakage light L3, fifth leakage light L5, and sixth leakage light L6, and is expressed by the following equation (3).

leakage light during black display=first leakage light $L1(Ta3 \times Ta2)$+second leakage light $L2(Ta4 \times \text{scattering leakage})$+third leakage light $L3$ (scattering leakage×scattering leakage)+fifth leakage light $L5(Ta4 \times Ta3)$+sixth leakage light $L6$(scattering leakage×$Ta1$)     (3)

At this point, the contrast ratio of the pair of polarizing plates is expressed by Tp/Tc, and is typically several tens of thousands one or more (for example, 10000 to 50000:1). Nonetheless, the reason why the contrast ratio of one display panel having the structure in which the liquid crystal cell is sandwiched between the pair of polarizing plates is only about several thousands:1 is that the light scattering and leaking from the transmission axis of one of the pair of polarizing plates toward the transmission axis of the other polarizing plate exists. That is, the light leaking without passing through the absorption axis of the polarizing plate exists. Thus, the contrast ratio of one display panel is decided by the dominant light leaking through the transmission axis of each of the pair of polarizing plates due to the scattering leakage. In this case, for example, although the contrast ratio of the pair of polarizing plates is several tens of thousands:1, the light of about 1/1500 leaks due to the scattering leakage from the transmission axis of one of the polarizing plates toward the transmission axis of the other polarizing plate, so that the contrast ratio of one display panel having the structure in which the liquid crystal cell is sandwiched between the pair of polarizing plates is only about 1000:1.

In this way, the contrast ratio of one display panel is decided by the light leaking without being transmitted through any absorption axis of the pair of polarizing plates in the light due to the scattering leakage.

This holds true for the case that the two liquid crystal display panels of first display panel 100 and second display panel 200 are used as illustrated in FIG. 3. In the five beams of leaked lights (first leakage light L1, second leakage light L2, third leakage light L3, fifth leakage light L5, sixth leakage light L6) that affect the contrast ratio, the light leaking without being transmitted through any absorption axes of first polarizing plate 31, second polarizing plate 32, third polarizing plate 33, and fourth polarizing plate 34 is third leakage light L3. That is, the contrast ratio of the liquid crystal display device using the two liquid crystal display panels of first display panel 100 and second display panel 200 is decided by dominant third leakage light L3. For example, in the case that the light of about 1/1500 leaks due to the scattering leakage of one display panel, the light of (1/1500)×(1/1500)=1/2.25 million leaks as third leakage light L3 depending on the scattering leakage of two display panels.

Additionally, the scattering leakage in the display panel is generated regardless of the absorption axis of the polarizing plate, but does not depend on the transmittance in the absorption axis direction of the polarizing plate. That is, third leakage light L3 depending only on the scattering leakage is the light leaking regardless of the four polarizing plates, but third leakage light L3 cannot be controlled by first polarizing plate 31, second polarizing plate 32, third polarizing plate 33, and fourth polarizing plate 34.

On the other hand, the magnitudes of the remaining four leaked lights (first leakage light L1, second leakage light L2, fifth leakage light L5, and sixth leakage light L6) depend on the transmittance in the absorption axis direction of the polarizing plate.

At this point, the contrast ratio of the pair of conventional polarizing plates is several tens of thousands:1 or more as described above. For example, the contrast ratio of the pair of polarizing plates is 10,000:1 corresponds to a combination of the pair of polarizing plates having degree of polarization P of 99.99%. The light of about 1/1500 light leaks due to the scattering leakage of one display panel.

For this reason, for example, assuming that Tt is 100% in the display panel sandwiched between the pair of polarizing plates having degree of polarization of P=99.99%, Ta=1/19999≈1/20000 is obtained from the above equation (1). When the light of about 1/1500 leaks due to the scattering leakage of one display panel, the light of (1/1500)×(1/2000) =1/30 million leaks as second leakage light L2 and sixth leakage light L6 that depend on the transmittance in the absorption axis direction of the polarizing plate and the scattering leakage of the display panel. The light of (1/20000)×(1/20000)=1/400 million leaks as first leakage light L1 and fifth leakage light L5 that depend on the transmittance in the absorption axis direction of the two polarizing plates.

Thus, the magnitudes of first leakage light L1, second leakage light L2, fifth leakage light L5, and sixth leakage light L6 are smaller than the magnitude of third leakage light L3.

That is, in the liquid crystal display device using the two liquid crystal display panels of first display panel 100 and second display panel 200, it is considered that the conventional polarizing plate having the high degree of polarization has over performance.

Based on such findings, the inventors of the present disclosure have considered that the degree of polarization of any of first polarizing plate 31, second polarizing plate 32, third polarizing plate 33, and fourth polarizing plate 34 may be decreased, and got an idea that the transmittance of the liquid crystal display device can be increased to increase the luminance of the display image without decreasing the contrast ratio of the liquid crystal display device too much by adjusting the transmittances in the absorption axis direction of first polarizing plate 31, second polarizing plate 32, third polarizing plate 33, and fourth polarizing plate 34.

Specifically, the inventors of the present disclosure have studied the combination of the transmittances of the polarizing plates such that the magnitudes of first leakage light L1, second leakage light L2, fifth leakage light L5, and sixth leakage light L6 do not exceed the magnitude of third leakage light L3 even if the degree of polarization of any one of the four polarizing plates of first polarizing plate 31, second polarizing plate 32, third polarizing plate 33, and fourth polarizing plate 34 is decreased. The specific study result will be described below.

As illustrated in FIG. 3, the transmittances (Ta1, Ta4) in the absorption axis direction of the first polarizing plate 31 and fourth polarizing plate 34 have a large influence on first leakage light L1, second leakage light L2, fifth leakage light L5, and sixth leakage light L6. Thus, in order to decrease first leakage light L1, second leakage light L2, fifth leakage light L5, and sixth leakage light L6, the transmittance (Ta1, Ta4) in the absorption axis direction is preferably decreased for at least one of first polarizing plate 31 and fourth polarizing plate 34.

For example, fifth leakage light L5 and sixth leakage light L6 can be decreased by decreasing the transmittance (Ta1) in the absorption axis direction of the first polarizing plate 31. The degree of polarization of first polarizing plate 31 may be increased in order to decrease the transmittance in the absorption axis direction of first polarizing plate 31. When fifth leakage light L5 and sixth leakage light L6 are decreased, the high contrast ratio can be maintained even if first leakage light L1 and second leakage light L2 are somewhat increased. That is, although the single transmittance of first polarizing plate 31 cannot be increased by keeping the transmittance (Ta1) in the absorption axis direction low, the single transmittances of the other three polarizing plates except for first polarizing plate 31 can be increased.

At this time, first leakage light L1 depends on the transmittances (Ta2, Ta3) in the absorption axis direction of the two polarizing plates of second polarizing plate 32 and third polarizing plate 33 among the other three polarizing plates. On the other hand, second leakage light L2 depends only on the transmittance (Ta4) in the absorption axis direction of only fourth polarizing plate 34 among the other three polarizing plates. Thus, first leakage light L1 that can increase the single transmittances of the two polarizing plates of second polarizing plate 32 and third polarizing plate 33 is preferably sacrificed when one of first leakage light L1 and second leakage light L2 is sacrificed to increase the magnitude of the leaked light.

In this case, the single transmittances of second polarizing plate 32 and third polarizing plate 33 can be increased by decreasing the transmittances (Ta2, Ta3) in the absorption axis direction of second polarizing plate 32 and third polarizing plate 33. The degrees of polarization of second polarizing plate 32 and third polarizing plate 33 may be decreased in order to decrease the transmittances in the absorption axis direction of second polarizing plate 32 and third polarizing plate 33. Specifically, the degree of polarization of each of second polarizing plate 32 and third polarizing plate 33 may be smaller than the degree of polarization of first polarizing plate 31. In this way, the transmittance of liquid crystal display device 1 can be increased by increasing the single transmittances of second polarizing plate 32 and third polarizing plate 33. Although the degrees of polarization of second polarizing plate 32 and third polarizing plate 33 are decreased by increasing the single transmittances of second polarizing plate 32 and third polarizing plate 33, third leakage light L3 is dominant in the contrast ratio of the liquid crystal display device, and the transmittance in the absorption axis direction of first polarizing plate 31 is decreased, so that the contrast ratio as the image display device is not decreased so much.

In this case, not only the degrees of polarization of second polarizing plate 32 and third polarizing plate 33 are set smaller than the degree of polarization of first polarizing plate 31, but also the degree of polarization of fourth polarizing plate 34 may be set smaller than the degree of polarization of first polarizing plate 31. Consequently, the single transmittance of fourth polarizing plate 34 can also be increased, so that the transmittance of the liquid crystal display device can further be increased. Although the degree of polarization of fourth polarizing plate 34 is decreased by increasing the single transmittance of fourth polarizing plate 34, third leakage light L3 is dominant in the contrast ratio of the liquid crystal display device, and the transmittance in the absorption axis direction of first polarizing plate 31 is decreased, so that the contrast ratio as the liquid crystal display device is not decreased so much.

Instead of increasing the transmittance (Ta1) in the absorption axis direction of first polarizing plate 31, the degree of polarization of fourth polarizing plate 34 may be increased to decrease the transmittance (Ta4) in the absorption axis direction of fourth polarizing plate 34. Consequently, second leakage light L2 and fifth leakage light L5 can be decreased, so that the high contrast ratio can be maintained even if first leakage light L1 and sixth leakage light L6 are somewhat increased. That is, although the single transmittance of fourth polarizing plate 34 cannot be increased by keeping the transmittance in the absorption axis direction low, the single transmittances of the other three polarizing plates except for fourth polarizing plate 34 can be increased.

At this point, in a similar way, only first leakage light L1 that can increase the single transmittances of the two polarizing plates of second polarizing plate 32 and third polarizing plate 33 may be sacrificed in first leakage light L1 and sixth leakage light L6, and the degrees of polarization of second polarizing plate 32 and third polarizing plate 33 may be decreased to increase the single transmittances of second polarizing plate 32 and third polarizing plate 33. In this way, the transmittance of the liquid crystal display device can be increased by increasing the single transmittances of second polarizing plate 32 and third polarizing plate 33.

In this case, not only the degrees of polarization of second polarizing plate 32 and third polarizing plate 33 are set smaller than the degree of polarization of first polarizing plate 31, but also the degree of polarization of first polarizing plate 31 may be set smaller than the degree of polarization of fourth polarizing plate 34. Consequently, the single transmittance of first polarizing plate 31 can also be increased, so that the transmittance of the liquid crystal display device can further be increased.

As a result of earnest study by the inventors, it has been found that, by defining the magnitude relationship of the degrees of polarization of first polarizing plate 31, second polarizing plate 32, third polarizing plate 33, and fourth polarizing plate 34, the transmittance can be increased while the high contrast ratio is maintained as the image display device.

Specifically, assuming that P1, P2, P3, P4 are the degrees of polarization of first polarizing plate 31, second polarizing plate 32, third polarizing plate 33, and fourth polarizing plate 34, respectively, one of a relational expression of $P1>P2, P3, P4$, a relational expression of $P4>P1, P2, P3$, and a relational expressions of $P1, P4>2, P3$ may be satisfied.

That is, the degree of polarization of at least one of first polarizing plate 31 and fourth polarizing plate 34 may be set larger than the degrees of polarization of second polarizing plate 32 or third polarizing plate 33. Consequently, the degrees of polarization of second polarizing plate 32 and third polarizing plate 33 can be set smaller than the degree of polarization of first polarizing plate 31 or fourth polarizing plate 34, so that the single transmittances of second polarizing plate 32 and third polarizing plate 33 can be increased.

For example, assuming that Tm1, Tm2, Tm3, Tm4 are the single transmittances of first polarizing plate 31, second polarizing plate 32, third polarizing plate 33, and fourth polarizing plate 34, respectively, a relational expression of $Tm1<Tm2, Tm3, Tm4$ is satisfied for $P1>P2, P3, P4$, a relational expression of $Tm4<Tm1, Tm2, Tm3$ is satisfied for $P4>P1, P2, P3$, and a relational expression of $Tm1, Tm4<Tm2, Tm3$ is satisfied for $P1, P4>P2, P3$.

As a result, although liquid crystal display device 1 includes the two display panels of first display panel 100 and second display panel 200, the transmission of liquid crystal display device 1 can be improved while the high contrast ratio of liquid crystal display device 1 is maintained. Thus, the decrease in luminance of the display image can be prevented.

Additionally, the temperature rise due to heat generation of the light absorption of second polarizing plate 32 and third polarizing plate 33 can be relieved by increasing the single transmittances of second polarizing plate 32 and third polarizing plate 33. Thus, reliability of liquid crystal display device 1 can be improved.

In particular, in the case that the relational expression of $P1>P2, P3, P4$ is satisfied, the degree of polarization of each of second polarizing plate 32, third polarizing plate 33, and fourth polarizing plate 34 can be smaller than the degree of polarization of first polarizing plate 31, so that the transmittances of the three polarizing plates of second polarizing plate 32, third polarizing plate 33, and fourth polarizing plate 34 can be increased. The temperature rise due to the heat generation of the light absorption of second polarizing plate 32, third polarizing plate 33, and fourth polarizing plate 34 can be relieved by increasing the single transmittances of second polarizing plate 32, third polarizing plate 33, and fourth polarizing plate 34. Thus, reliability of liquid crystal display device 1 can be improved.

In particular, in the case that fourth polarizing plate 34 is constructed with an absorption type polarizing plate, fourth polarizing plate 34 absorbs the light from the backlight to tend to become high temperature. Accordingly, the expression of $P1>P4$ is satisfied to relatively increase the transmittance of P4, so that fourth polarizing plate 34 can be prevented from absorbing the light, and the temperature rise can be prevented.

Similarly, in the case that the relational expression of $P4>P1, P2, P3$ is satisfied, the degrees of polarization of first polarizing plate 31, second polarizing plate 32, and third polarizing plate 33 can be set smaller than the degree of polarization of fourth polarizing plate 34. As a result, the single transmittances of the three polarizing plates of first polarizing plate 31, second polarizing plate 32, and third polarizing plate 33 can be increased.

Consequently, the transmittance of liquid crystal display device 1 can further be improved, so that the degradation of the luminance of the display image can further be prevented.

From the viewpoint of the image quality, the degree of polarization (P1) of first polarizing plate 31 on the observer's side is preferably larger than the degree of polarization (P4) of fourth polarizing plate 34.

In liquid crystal display device 1 of the first exemplary embodiment, P1≥99.99% and 99.65%≤P2, P3, P4<99.99%, P4≥99.99% and 99.65%≤P1, P2, P3<99.99%, or P1, P4≥99.99% and 99.58%≤P2, P3<99.99% hold.

The degrees of polarization of first polarizing plate 31, second polarizing plate 32, third polarizing plate 33, and fourth polarizing plate 34 are set within the range of P1≥99.99% and 99.65%≤P2, P3, P4<99.99%, the high contrast ratio can be obtained as the liquid crystal display device even if the degrees of polarization of second polarizing plate 32, third polarizing plate 33, and fourth polarizing plate 34 are smaller than the degree of polarization of first polarizing plate 31.

When all of degrees of polarization P1 to P4 are 99.99% like the conventional polarizing plate, the transmittance (Ta1, Ta2, Ta3, Ta4) in the absorption axis direction=1/20000 is obtained from the equation (1). When 1/1500 as the scattering leakage is substituted into the equation (3) in a similar way, the leakage light is 1/1.08 million and the contrast ratio is 1.94 million 1.

On the other hand, for P1=99.99% and P2=P3=P4=99.65%, transmittance (Ta1)=1/20000 and transmittance (Ta2)=transmittance (Ta3)=transmittance (Ta4)=1/571 are obtained from the equation (1). When 1/1500 as the scattering leakage is substituted into the equation (3), the leakage light is about 1/210000, and the contrast ratio of 200000:1 can be maintained. Thus, in the case that the above range of the degree of polarization is adopted, while the contrast ratio of 200000:1 that is required for an HDR standard (ITU-R (International Telecommunication Union Radio-communications Sector) BT. 2100) is maintained, the transmittance of liquid crystal display device 1 can be improved to prevent the decrease in luminance of the display image.

Similarly, the degrees of polarization of first polarizing plate 31, second polarizing plate 32, third polarizing plate 33, and fourth polarizing plate 34 are set within the range of P4≥99.99% and 99.65%≥P1, P2, P3<99.99%, the high contrast ratio can be obtained as the liquid crystal display device even if the degrees of polarization of first polarizing plate 31, second polarizing plate 32, and third polarizing plate 33 are smaller than the degree of polarization of fourth polarizing plate 34.

For example, for P4=99.99% and P1=P2=P3=99.65%, transmittance (Ta4)=1/20000 and transmittance (Ta1)=transmittance (Ta2)=transmittance (Ta3)=1/571 are obtained from the equation (1). When 1/1500 as the scattering leakage is substituted into the equation (3), the leakage light is about 1/210000, and the contrast ratio of 200000:1 can be maintained. Thus, in the case that the above range of degree of polarization is adopted, while the contrast ratio of 200000:1 that is required for the HDR standard is maintained, the transmittance of liquid crystal display device 1 can be improved to prevent decrease in luminance of the display image.

Similarly, in the case that the degrees of polarization of first polarizing plate 31, second polarizing plate 32, third polarizing plate 33 and fourth polarizing plate 34 are set within the range of P1, P4=99.99% and P2, P3=99.58%, transmittance (Ta1)=transmittance (Ta4)=1/20000 and transmittance (Ta2)=transmittance (Ta3)=1/476 are obtained from the equation (1). When 1/1500 as the scattering leakage is substituted into the equation (3), the leakage light becomes about 1/200000, and the contrast ratio of 200000:1 can be maintained. Therefore, in the case that P1, P4≥99.99% and 99.58%≤P2, P3<99.99%, while the contrast ratio of 200000:1 that is required for the HDR standard is maintained, the transmittance of liquid crystal display device 1 can be improved to prevent the decrease in luminance of the display image.

In liquid crystal display device 1 of the first exemplary embodiment, P1≥99.99% and 99.92%≤P2, P3, P4<99.99%, P4≥99.99% and 99.92%≤P1, P2, P3<99.99%, or P1, P4≥99.99% and 99.87%≤P2, P3<99.99% may hold.

The degrees of polarization of first polarizing plate 31, second polarizing plate 32, third polarizing plate 33, and fourth polarizing plate 34 are set within the range of P1≥99.99% and 99.92%≤P2, P3, P4<99.99%, the extremely high contrast ratio can be obtained as the liquid crystal display device even if the degrees of polarization of second polarizing plate 32, third polarizing plate 33, and fourth polarizing plate 34 are smaller than the degree of polarization of first polarizing plate 31.

For example, for P1=99.99% and P2=P3=P4=99.92%, transmittance (Ta1)=1/20000 and transmittance (Ta2)=transmittance (Ta3)=transmittance (Ta4)=1/2500 are obtained from the equation (1). When 1/1500 as the scattering leakage is substituted into the equation (3), the leakage light is about 1/1.08 million, and the contrast ratio of 1 million:1 can be maintained. It has been confirmed by experiments of the inventors that the contrast comparable to that of an organic EL display device can be exhibited in the case that the contrast ratio of the display panel can be maintained at 1 million:1. Thus, in the case that the above range of degree of polarization is adopted, while the contrast ratio of 1 million:1 comparable to that of the organic EL display device is maintained, the transmittance of liquid crystal display device 1 can be improved to prevent decrease in luminance of the display image.

Similarly, the degrees of polarization of first polarizing plate 31, second polarizing plate 32, third polarizing plate 33, and fourth polarizing plate 34 are set within the range of P4≥99.99% and 99.92%≤P1, P2, P3<99.99%, the extremely high contrast ratio can be obtained as the liquid crystal display device even if the degrees of polarization of first polarizing plate 31, second polarizing plate 32, and third polarizing plate 33 are smaller than the degree of polarization of fourth polarizing plate 34.

For example, for P4=99.99% and P1=P2=P3=99.92%, transmittance (Ta4)=1/20 thousand and transmittance (Ta1)=transmittance (Ta2)=transmittance (Ta3)=1/2500 are obtained from the equation (1). When 1/1500 as the scattering leakage is substituted into the equation (3), the leakage light is about 1/1.08 million, and the contrast ratio of 1 million:1 can be maintained. Thus, in the case that the above range of degree of polarization is adopted, while the contrast ratio of 1 million:1 comparable to that of the organic EL display device is maintained, the transmittance of liquid crystal display device 1 can be improved to prevent decrease in luminance of the display image.

Similarly, in the case that the degrees of polarization of first polarizing plate 31, second polarizing plate 32, third polarizing plate 33 and fourth polarizing plate 34 are P1, P4=99.99% and P2, P3=99.87%, transmittance (Ta1)=transmittance (Ta4)=1/20 thousand and transmittance (Ta2)=transmittance (Ta3)=1/1538 are obtained from the equation (1). When 1/1500 as the scattering leakage is substituted into the equation (3), the leakage light becomes about 1/1.07 million, and the contrast ratio of 1 million:1 can be maintained. Therefore, in the case that P1, P4≥99.99%, and 99.87%≤P2, P3<99.99% are adopted as the range of the degree of polarization, while the contrast ratio of 1 million:1 comparable to that of the organic EL display device is maintained, the transmittance of liquid crystal display device 1 can be improved to prevent decrease in luminance of the display image.

In liquid crystal display device 1 of the first exemplary embodiment, assuming that d1, d2, d3, d4 are thicknesses of the polarizing plates of the first polarizing plate 31, second polarizing plate 32, third polarizing plate 33, and fourth polarizing plate 34, respectively, the relational expression of d1, d4>d2, d3 may be satisfied.

Consequently, the degrees of polarization of second polarizing plate 32 and third polarizing plate 33 are set smaller than the degrees of polarization of first polarizing plate 31 and fourth polarizing plate 34, so that the transmittances of second polarizing plate 32 and third polarizing plate 33 can easily be increased higher than the transmittances of first polarizing plate 31 and fourth polarizing plate 34.

The distance between first liquid crystal cell 13 and second liquid crystal cell 23 can be shortened by satisfying the relational expression of d1, d4>d2, d3, so that the parallax of the display image can be reduced.

In liquid crystal display device 1 of the first exemplary embodiment, first polarizing plate 31 and fourth polarizing plate 34 are an absorption type polarizing plate. In particular, for P1>P4, the transmittance of fourth polarizing plate 34 is higher than the transmittance of first polarizing plate 31 while the high contrast ratio is maintained using the absorption type polarizing plate, so that fourth polarizing plate 34 relatively easily transmits the light to prevent the heat generation due to the light absorption of fourth polarizing plate 34.

Second Exemplary Embodiment

Figure 4:
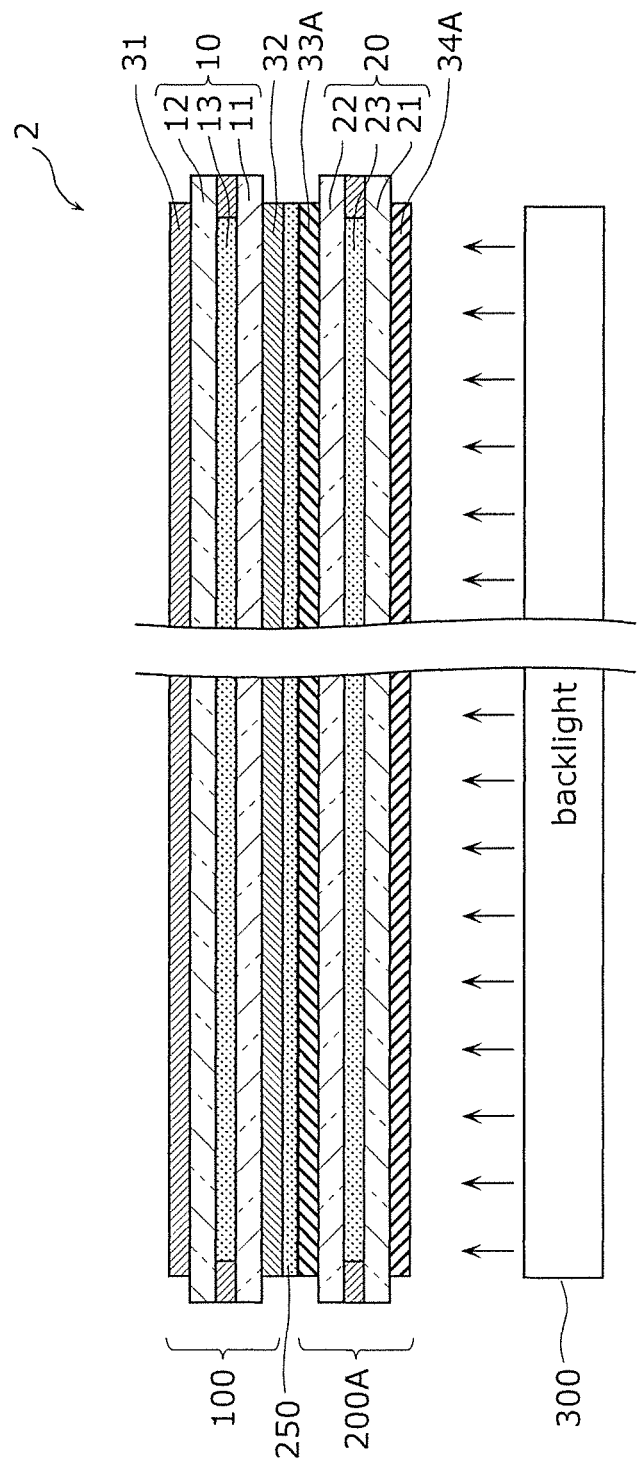
FIG. 4 is a sectional view illustrating a configuration of the liquid crystal display device of the second exemplary embodiment.

Liquid crystal display device 2 according to a second exemplary embodiment will be described below with reference to FIG. 4. FIG. 4 is a sectional view illustrating a configuration of liquid crystal display device 2 of the second exemplary embodiment.

In liquid crystal display device 2 of the second exemplary embodiment, the reflection type polarizing plate is used as at least one of second polarizing plate 32, third polarizing plate 33, and fourth polarizing plate 34 of liquid crystal display device 1 of the first embodiment. The reflection type polarizing plate reflects one of two orthogonal components of transmitted light while transmitting the other orthogonal component, thereby performing the polarization. First polarizing plate 31 and the polarizing plate that is not the reflection type polarizing plate among second polarizing plate 32, third polarizing plate 33, and fourth polarizing plate 34 are the absorption type polarizing plate, similarly to the first exemplary embodiment.

The reflection type polarizing plate has a low degree of polarization, the relational expression of P1>P2, P3, P4, or the relational expression of P1, P4>P2, P3 can easily be satisfied with respect to the degrees of polarization of second polarizing plate 32, third polarizing plate 33, and fourth polarizing plate 34 by using at least one of second polarizing plate 32, third polarizing plate 33, and fourth polarizing plate 34 as the reflection type polarizing plate.

Consequently, similarly to the first exemplary embodiment, while the high contrast ratio is maintained, the transmittance can be improved to prevent the decrease in luminance of the display image.

The light can be not absorbed but reflected and polarized using the reflection type polarizing plate, so that the reflected light can be reused. Consequently, the transmittance of liquid crystal display device 2 can further be improved.

In liquid crystal display device 2 of FIG. 4, third polarizing plate 33A and fourth polarizing plate 34A are the reflection type polarizing plate. That is, second display panel 200A has a structure in which second liquid crystal cell 20 is sandwiched between the pair of third polarizing plate 33A and fourth polarizing plate 34A.

When third polarizing plate 33A and fourth polarizing plate 34A are not the reflection type polarizing plate but the absorption type polarizing plates similarly to the first exemplary embodiment, second liquid crystal cell 20 to which third polarizing plate 33A and fourth polarizing plate 34A are bonded is located on the side of backlight 300, so that third polarizing plate 33A and fourth polarizing plate 34A become high temperature as compared with first polarizing plate 31 and second polarizing plate 32 due to the light absorption.

For this reason, the reflection type polarizing plate is used as third polarizing plate 33A and fourth polarizing plate 34A as in the second exemplary embodiment, which allows third polarizing plate 33A and fourth polarizing plate 34A to be prevented from generating the heat due to the light absorption. Consequently, the reliability of liquid crystal display device 2 can further be improved.

The thickness of at least one of second polarizing plate 32 and third polarizing plate 33A is preferably smaller than the thickness of first polarizing plate 31.

Consequently, the single transmittances of second polarizing plate 32 and third polarizing plate 33A can be increased, so that the transmittance of liquid crystal display device 2 can further be increased. A distance between first liquid crystal cell 13 and second liquid crystal cell 23 can be shortened, so that parallax of the display image can be reduced.

Figure 5A:
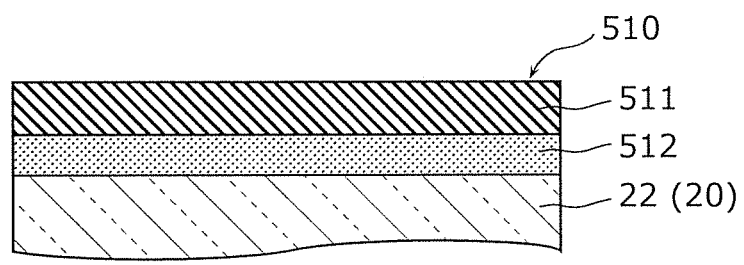
FIG. 5A is a sectional view of first reflection type polarizing plate.
Figure 5B:
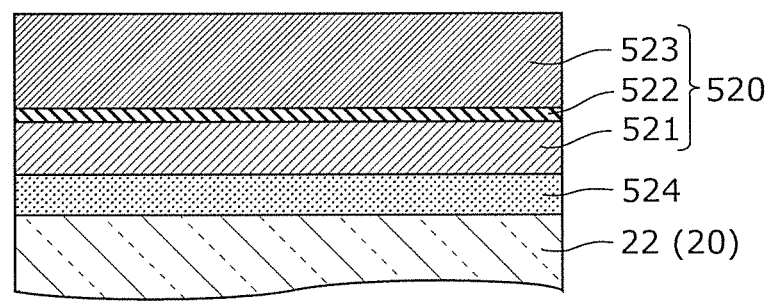
FIG. 5B is a sectional view of second reflection type polarizing plate.
Figure 5C:
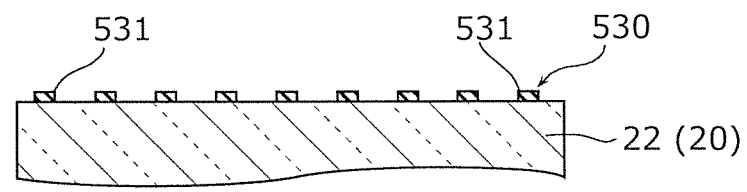
FIG. 5C is a sectional view of third reflection type polarizing plate.

FIGS. 5A to 5C illustrate one example of the reflection type polarizing plate used in the second exemplary embodiment. FIGS. 5A to 5C illustrate an example of the reflection type polarizing plate provided on second counter substrate 22 of second liquid crystal cell 20. FIG. 5A is a sectional view of first reflection type polarizing plate 510, FIG. 5B is a sectional view of second reflection type polarizing plate 520, and FIG. 5C is a sectional view of third reflection type polarizing plate 530.

As illustrated in FIG. 5A, first reflection type polarizing plate 510 is constructed with multilayer thin film laminated body 511 (for example, 26 μm) in which a plurality of thin films such as dielectric films having different refractive indices are laminated. As illustrated in FIG. 5A, first reflection type polarizing plate 510 can be bonded to second counter substrate 22 of second liquid crystal cell 20 by adhesive layer 512 (for example, 12 μm). For example, an APCF included polarizing plate (manufactured by Nitto Denko Corporation) or DBEF (manufactured by 3M Company) can be cited as first reflection type polarizing plate 510. Adhesive layer 512 may be provided integrally with first reflection type polarizing plate 510, or separated from first reflection type polarizing plate 510.

As illustrated in FIG. 5B, second reflection type polarizing plate 520 includes base material 521 (for example, 80 μm) such as TAC, wire grid layer 522 (for example, 1 μm or less) disposed on base material 521, and protective film 523 (for example, 110 μm) disposed on wire grid layer 522. A plurality of wire grids made of a metal wire such as aluminum are arranged in wire grid layer 522. As illustrated in FIG. 5B, second reflection type polarizing plate 520 can be bonded to second counter substrate 22 of second liquid crystal cell 20 by adhesive layer 524 (for example, 25 μm). Adhesive layer 524 may be provided integrally with second reflection type polarizing plate 520, or separated from second reflection type polarizing plate 520. Protective film 523 may be peeled off after second reflection type polarizing plate 520 adheres.

As illustrated in FIG. 5C, third reflection type polarizing plate 530 includes a plurality of wire grids 531. The wire grid 531 is a metal wire such as aluminum. As illustrated in FIG. 5C, third reflection type polarizing plate 530 that is wire grid 531 is directly provided on the outer surface of second counter substrate 22 of second liquid crystal cell 20. For example, the plurality of wire grids 531 have a pitch of 150 nm, a width of 75 nm, and a thickness of 100 nm. However, the present disclosure is not limited to this configuration.

Third Exemplary Embodiment

Liquid crystal display device 3 according to a third exemplary embodiment will be described below with reference to FIG. 6. FIG. 6 is a sectional view illustrating a configuration of liquid crystal display device 3 of the third exemplary embodiment.

In liquid crystal display device 3 of the third exemplary embodiment, an in-cell reflection type polarizing plate is used as at least one of second polarizing plate 32, third polarizing plate 33, and fourth polarizing plate 34 of liquid crystal display device 1 of the first embodiment. The in-cell reflection type polarizing plate is a reflection type polarizing plate incorporated as a part of the liquid crystal cell.

The in-cell reflection type polarizing plate also has the low degree of polarization, the relational expression of P1>P2, P3, P4, or the relational expression of P1, P4>P2, P3 can easily be satisfied with respect to the degrees of polarization of second polarizing plate 32, third polarizing plate 33, and fourth polarizing plate 34 by using at least one of second polarizing plate 32, third polarizing plate 33, and fourth polarizing plate 34 as the reflection type polarizing plate.

Consequently, liquid crystal display device 3 that can improve the transmittance while maintaining the high contrast ratio can be constructed similarly to the first exemplary embodiment. Thus, the decrease in luminance of the display image can be prevented.

Similarly to the second exemplary embodiment, the transmittance of liquid crystal display device 3 can further be improved using the in-cell reflection type polarizing plate.

Additionally, the use of the in-cell reflection type polarizing plate can decrease the thickness as compared with the display panel in which the absorption type polarizing plate is bonded to the liquid crystal cell. Consequently, the distance between first liquid crystal cell 13 and second liquid crystal cell 23 can be shortened, so that generation of a warp can be prevented in the display panel while the parallax of the display image is reduced. Thus, the image quality can be improved.

In liquid crystal display device 3 of FIG. 6, the in-cell type reflection type polarizing plate is used as third polarizing plate 33B and fourth polarizing plate 34B, of second polarizing plate 32, third polarizing plate 33 and fourth polarizing plate 34. That is, second display panel 200B has a structure in which third polarizing plate 33B and fourth polarizing plate 34B are incorporated in a part of second liquid crystal cell 20B.

Consequently, second display panel 200B can be thinned, so that the generation of the warp can be prevented in second display panel 200B while the parallax of the display image is reduced in second display panel 200B.

Furthermore, the in-cell reflection type polarizing plate is used as third polarizing plate 33B on the side of first display panel 100, which allows the surface (the outer surface of second counter substrate 22) on the side of first display panel 100 in second display panel 200B to be flattened. Consequently, first display panel 100 and second display panel 200B can easily be bonded together with high accuracy. Thus, a yield of liquid crystal display device 3 can be improved.

Additionally, similarly to the second exemplary embodiment, the reflection type polarizing plate is used as third polarizing plate 33B and fourth polarizing plate 34B, which allows third polarizing plate 33B and fourth polarizing plate 34B to be prevented from generating the heat due to the light absorption. Consequently, reliability of liquid crystal display device 3 can further be improved.

In the third exemplary embodiment, the thickness of at least one of second polarizing plate 32 and third polarizing plate 33B is preferably smaller than the thickness of first polarizing plate 31. In particular, in the case that the in-cell reflection type polarizing plate is used as third polarizing plate 33B, the in-cell reflection type polarizing plate can be made thinner than the absorption type polarizing plate, so that third polarizing plate 33B can easily made thinner than the first polarizing plate 31.

Consequently, the single transmittances of second polarizing plate 32 and third polarizing plate 33B can be increased, so that the transmittance of liquid crystal display device 3 can further be increased.

Figure 7:
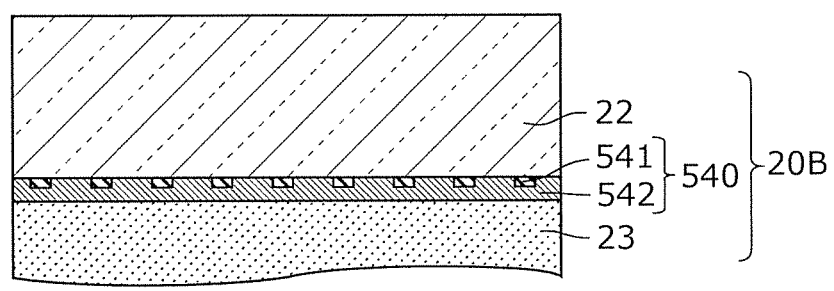
FIG. 7 is a sectional view illustrating one example of an in-cell reflection type polarizing plate.

FIG. 7 illustrates one example of the in-cell reflection type polarizing plate used in the third exemplary embodiment. FIG. 7 is a sectional view illustrating in-cell reflection type polarizing plate 540 provided on second counter substrate 22 of second liquid crystal cell 20B.

The in-cell reflection type polarizing plate 540 of FIG. 7 includes a plurality of wire grids 541 and insulating layer 542 covering the plurality of wire grids 541. The wire grid 541 is a metal wire such as aluminum, and is directly provided on the inner surface of second counter substrate 22 of second liquid crystal cell 20B as illustrated in FIG. 7. For example, the plurality of wire grids 541 have a pitch of 150 nm, a width of 75 nm, and a thickness of 100 nm. However, the present disclosure is not limited to this configuration.

In liquid crystal display device 3 of FIG. 6, the in-cell reflection type polarizing plate is used as third polarizing plate 33B and fourth polarizing plate 34B, and the absorption type reflection type plate is used as first polarizing plate 31 and second polarizing plate 32. However, the present disclosure is not limited to this configuration.

Figure 8:
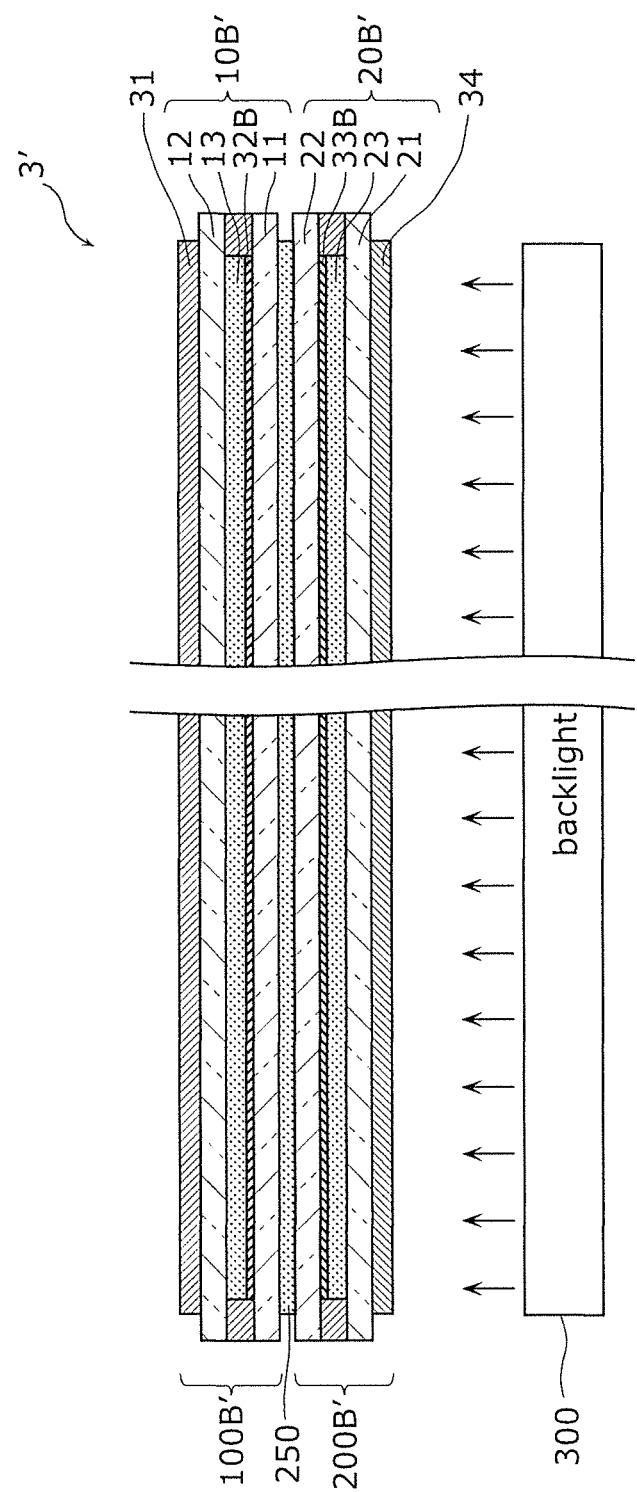
FIG. 8 is a sectional view illustrating a configuration of the liquid crystal display device according to a first modification of the third exemplary embodiment.

For example, as in liquid crystal display device 3' of FIG. 8, the in-cell reflection type polarizing plate may be used as second polarizing plate 32B and third polarizing plate 33B, and the absorption type polarizing plate may be used as first polarizing plate 31 and fourth polarizing plate 34. That is, in liquid crystal display device 3', the first display panel 100B' has a structure in which third polarizing plate 32B is incorporated in a part of first liquid crystal cell 10B', and second display panel 200B' has a structure in which third polarizing plate 32B is incorporated in a part of second liquid crystal cell 20B'.

Consequently, the parallax of the display image can further be reduced as compared with liquid crystal display device 3 in FIG. 6.

In liquid crystal display device 3' of FIG. 8, the thickness of at least one of second polarizing plate 32B and third polarizing plate 33B is preferably smaller than the thickness of first polarizing plate 31.

Consequently, the single transmittances of second polarizing plate 32B and third polarizing plate 33B can be increased, so that the transmittance of liquid crystal display device 3 can further be increased.

Figure 9:
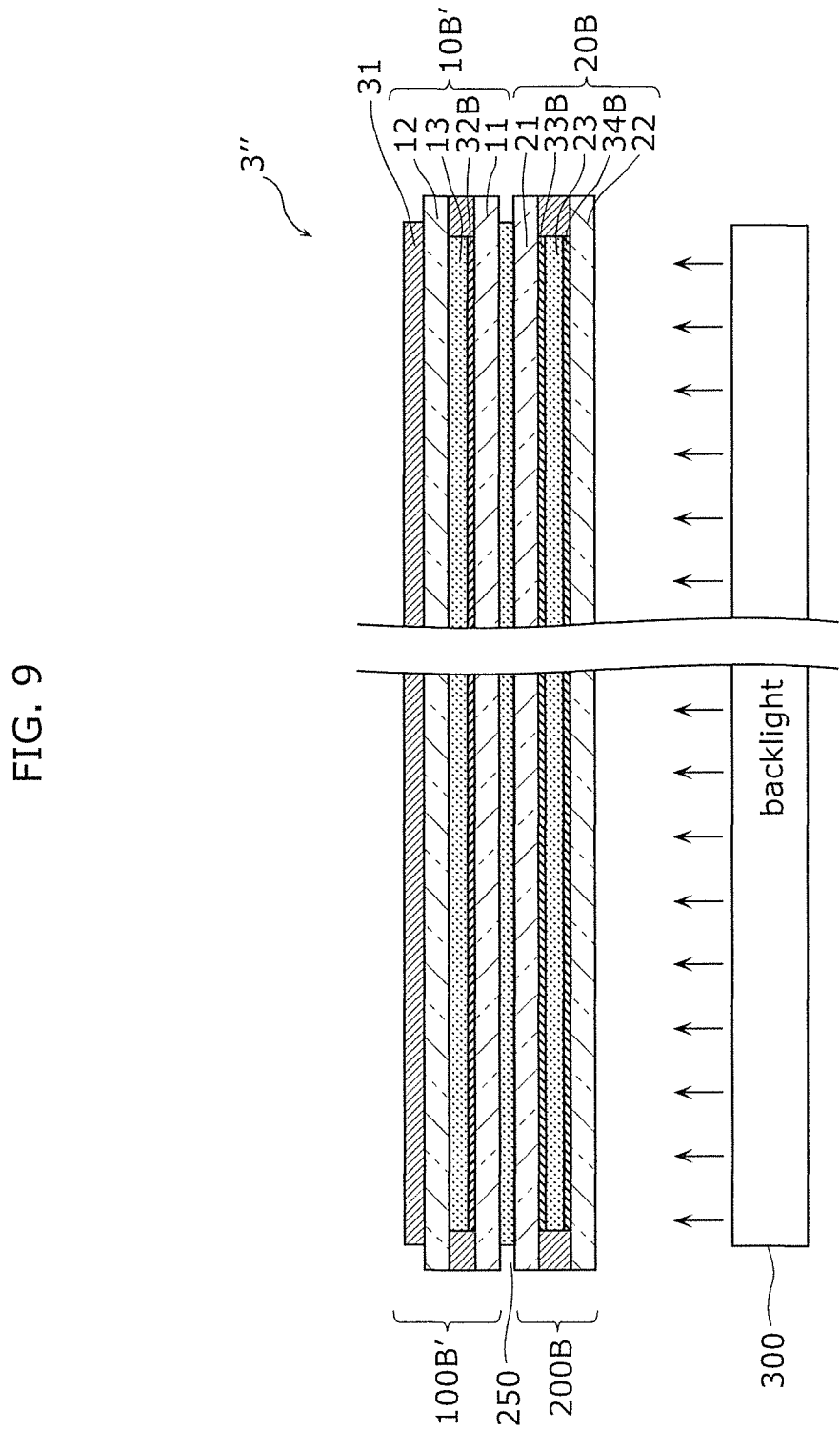
FIG. 9 is a sectional view illustrating a configuration of the liquid crystal display device according to a second modification of the third exemplary embodiment.

As in liquid crystal display device 3" of FIG. 9, the in-cell reflection type polarizing plate may be used as second polarizing plate 32B, third polarizing plate 33B and fourth polarizing plate 34B, and the absorption type polarizing plate may be used as first polarizing plate 31. That is, liquid crystal display device 3" in FIG. 8 has a structure in which first display panel 100B' in FIG. 8 and second display panel 200B in FIG. 6 are bonded together.

With this configuration, the effects of both liquid crystal display device 3 in FIG. 6 and liquid crystal display device 3' in FIG. 8 can be obtained. Thus, liquid crystal display device 3" having the extremely excellent image quality can be constructed.

Modifications

The liquid crystal display device of the present disclosure is described above based on the exemplary embodiments, but the present disclosure is not limited to the exemplary embodiments.

In each of the above exemplary embodiments, the polarizing in which the single transmittance is increased with decreasing degree of polarization is used as first polarizing plate 31, second polarizing plate 32, third polarizing plate 33 and fourth polarizing plate 34. However, the present disclosure is not limited to this configuration For example, the polarizing plate in which the single transmittance is not increased to much even if the degree of polarization degree is low may be used as first polarizing plate 31, second polarizing plate 32, third polarizing plate 33, and fourth polarizing plate 34. That is, even if the relational expression of P1>P2, P3, P4 is satisfied, the relational expression of Tm1<Tm2, Tm3, Tm4 may not necessarily be satisfied. Similarly, the relational expression of Tm4<Tm1, Tm2, Tm3 may not necessarily be satisfied even if the relational expression of P4>P1, P2, P3 is satisfied, and the relational expression of Tm1, Tm4<Tm2, Tm3 may not necessarily be satisfied even if the relational expression of P1, P4>P2, P3 is satisfied.

In each of the above embodiments, an optical member such as a retardation film may be bonded to first polarizing plate 31, second polarizing plate 32, third polarizing plate 33, and fourth polarizing plate 34.

Those skilled in the art will readily appreciate that many modifications are possible in the above exemplary embodiment and variations without materially departing from the novel teachings and advantages of the present disclosure. Accordingly, all such modifications are intended to be included within the scope of the present disclosure.

What is claimed is:

1. A liquid crystal display device comprising:
   a first liquid crystal cell,
   a second liquid crystal cell disposed on a back side of the first liquid crystal cell;
   a first polarizing plate disposed on a front side of the first liquid crystal cell;
   a second polarizing plate disposed between the first liquid crystal cell and the second liquid crystal cell;
   a third polarizing plate disposed between the second polarizing plate and the second liquid crystal cell; and
   a fourth polarizing plate disposed on a back side of the second liquid crystal cell,
   wherein P1, P2, P3, P4 represent degrees of polarization of the first polarizing plate, the second polarizing plate, the third polarizing plate, and the fourth polarizing plate, respectively, one of a relational expression of P1>P2, P3, P4, a relational expressions of P4>P1, P2, P3, and a relational expression of P1, P4>P2, P3 is satisfied wherein each of the first polarizing plate, the second polarizing plate, the third polarizing plate, and the fourth polarizing plate includes a base material and polarizers laminated on the base material, and d1, d2, d3, d4 represent thicknesses of the polarizers of the first polarizing plate, the second polarizing plate, the third polarizing plate, and the fourth polarizing plate, respectively, a relational expression of d1, d4>d2, d3 is satisfied.

2. The liquid crystal display device according to claim 1, wherein P1≥99.99% and 99.65%≤P2, P3, P4<99.99%, P4≥99.99% and 99.65%≤P1, P2, P3<99.99%, or P1, P4≥99.99% and 99.58%≤P1, P2, P3<99.99% hold.

3. The liquid crystal display device according to claim 2, wherein P1≥99.99% and 99.92%≤P2, P3, P4<99.99%, P4≥99.99% and 99.92%≤P1, P2, P3<99.99%, or P1, P4≥99.99% and 99.87%≤P1, P2, P3<99.99% hold.

4. The liquid crystal display device according to claim 1, wherein Tm1, Tm2, Tm3, Tm4 represent single transmittances of the first polarizing plate, the second polarizing plate, the third polarizing plate, and the fourth polarizing plate, respectively, a relational expression of Tm1<Tm2, Tm3, Tm4, a relational expression of Tm4<Tm1, Tm2, Tm3, or a relational expression of Tm1, Tm4<Tm2, Tm3 is satisfied.

5. The liquid crystal display device according to claim 1, wherein each of the first polarizing plate and the fourth polarizing plate is an absorption type polarizing plate.

6. The liquid crystal display device according to claim 1, wherein at least one of the second polarizing plate, the third polarizing plate, and the fourth polarizing plate is a reflection type polarizing plate.

7. The liquid crystal display device according to claim 6, wherein each of the third polarizing plate and the fourth polarizing plate is the reflection type polarizing plate.

8. The liquid crystal display device according to claim 6, wherein a thickness of at least one of the second polarizing plate and the third polarizing plate is smaller than a thickness of the first polarizing plate.

9. The liquid crystal display device according to claim 1, wherein at least one of the second polarizing plate, the third polarizing plate, and the fourth polarizing plate is an in-cell reflection type polarizing plate.

10. The liquid crystal display device according to claim 9, wherein the third polarizing plate is the in-cell reflection type polarizing plate.

11. The liquid crystal display device according to claim 10, wherein the thickness of the third polarizing plate is smaller than a thickness of the first polarizing plate.

12. The liquid crystal display device according to claim 9, wherein the second polarizing plate is the in-cell reflection type polarizing plate.

13. The liquid crystal display device according to claim 12, wherein the thickness of the second polarizing plate is smaller than the thickness of the first polarizing plate.

14. The liquid crystal display device according to claim 9, wherein each of the second polarizing plate, the third polarizing plate, and the fourth polarizing plate is the in-cell reflection type polarizing plate.

* * * * *